United States Patent
Wunderlich (10) Patent No.: US 11,433,905 B2
(45) Date of Patent: Sep. 6, 2022

(54) METHOD FOR OPERATING A MOTOR VEHICLE IN AN ACTIVATED, AT LEAST PARTIALLY AUTONOMOUS DRIVING MODE AND AUTHORIZATION DEVICE FOR A MOTOR VEHICLE AND A MOTOR VEHICLE

(71) Applicant: AUDI AG, Ingolstadt (DE)

(72) Inventor: Matthias Wunderlich, Ingolstadt (DE)

(73) Assignee: Audi AG, Ingolstadt (DE)

( * ) Notice: Subject to any disclaimer, the term of this patent is extended or adjusted under 35 U.S.C. 154(b) by 454 days.

(21) Appl. No.: 16/467,322

(22) PCT Filed: Feb. 20, 2018

(86) PCT No.: PCT/EP2018/054069
§ 371 (c)(1),
(2) Date: Jun. 6, 2019

(87) PCT Pub. No.: WO2018/153826
PCT Pub. Date: Aug. 30, 2018

(65) Prior Publication Data
US 2020/0062265 A1    Feb. 27, 2020

(30) Foreign Application Priority Data
Feb. 22, 2017  (DE) .................... 10 2017 202 834.3

(51) Int. Cl.
*B60W 40/08* (2012.01)
*B60W 30/18* (2012.01)
(Continued)

(52) U.S. Cl.
CPC ............ *B60W 40/08* (2013.01); *B60W 30/18* (2013.01); *B60W 50/08* (2013.01); *G05D 1/0088* (2013.01);
(Continued)

(58) Field of Classification Search
CPC ...... B60W 40/08; B60W 30/18; B60W 50/08; B60W 2040/0809; B60W 2540/043;
(Continued)

(56) References Cited

U.S. PATENT DOCUMENTS 6,552,648 B1    4/2003    Rick et al.
9,108,592 B2    8/2015    Nordbruch
(Continued)

FOREIGN PATENT DOCUMENTS

CN    103192711 A    7/2013
CN    103970084 A    8/2014
(Continued)

OTHER PUBLICATIONS

International Preliminary Report on Patentability directed to related International Patent Application No. PCT/EP2018/054069, dated Aug. 27, 2019, with attached English-language translation; 14 pages.
(Continued)

*Primary Examiner* — Peter D Nolan
*Assistant Examiner* — Tanya C Sienko
(74) *Attorney, Agent, or Firm* — Sterne, Kessler, Goldstein & Fox P.L.L.C.

(57) ABSTRACT

The present application relates to a method for operating a motor vehicle in an activated at least semi-autonomous driving mode, with the motor vehicle comprising a control unit which controls the motor vehicle in the at least one activated semi-autonomous driving mode. A detection device arranged in the motor vehicle detects at least one motor vehicle occupant (step S1). An authorization device linked to the detection device checks whether at least one of the at least one detected motor vehicle occupants meets at least one authorization criterion (step S2). If this is the case, the authorization device generates an enable signal (step
(Continued)

S3a) and sends it to the control unit, which then activates the at least semi-autonomous drive mode (step S4). If the at least one authorization criterion is not met, the authorization device sends out an inquiry signal to an authorization device external to the vehicle (step S3b) and, depending on the external release signal received in response to the inquiry signal, forwards the enable signal to the control unit.

17 Claims, 2 Drawing Sheets

(51) Int. Cl.
- *B60W 50/08* (2020.01)
- *G05D 1/00* (2006.01)
- *G10L 15/22* (2006.01)
- *G10L 25/78* (2013.01)
- *G06V 20/59* (2022.01)
- *G06V 40/10* (2022.01)

(52) U.S. Cl.
CPC ............ *G10L 15/22* (2013.01); *G10L 25/78* (2013.01); *B60W 2040/0809* (2013.01); *B60W 2540/043* (2020.02); *G06V 20/59* (2022.01); *G06V 40/103* (2022.01)

(58) Field of Classification Search
CPC ..... B60W 60/0051; B60W 2050/0064; B60W 2540/045; B60W 50/12; G05D 1/0088; G10L 15/22; G10L 25/78; G06K 9/00369; G06K 9/00832; G06F 21/32; B60K 28/02
See application file for complete search history.

(56) References Cited

U.S. PATENT DOCUMENTS

| | | | | |
|---|---|---|---|---|
| 9,475,496 | B2* | 10/2016 | Attard | B60W 50/12 |
| 9,688,288 | B1* | 6/2017 | Lathrop | G01C 21/3697 |
| 9,744,941 | B2 | 8/2017 | Geissenhoner | |
| 10,088,844 | B2* | 10/2018 | Attard | B60W 50/14 |
| 10,150,448 | B2 | 12/2018 | Huennekens et al. | |
| 2006/0190419 | A1 | 8/2006 | Bunn et al. | |
| 2014/0088814 | A1 | 3/2014 | You et al. | |
| 2014/0358327 | A1 | 12/2014 | Nordbruch | |
| 2015/0191178 | A1 | 7/2015 | Roy et al. | |
| 2016/0347282 | A1 | 12/2016 | Krishnan | |
| 2017/0038773 | A1 | 2/2017 | Gordon et al. | |
| 2018/0072345 | A1 | 3/2018 | Nicodemus et al. | |
| 2018/0222442 | A1 | 8/2018 | Sellschopp | |
| 2019/0219560 | A1* | 7/2019 | Le Naour | G01N 21/3563 |

FOREIGN PATENT DOCUMENTS

| | | | | |
|---|---|---|---|---|
| CN | 104648383 A | 5/2015 | | |
| CN | 105026224 A | 11/2015 | | |
| CN | 105774709 A | 7/2016 | | |
| CN | 107215330 A | 9/2017 | | |
| DE | 19508370 A1 | 9/1996 | | |
| DE | 102011083944 A1 | 4/2013 | | |
| DE | 102012223758 A1 | 3/2014 | | |
| DE | 102014013298 A1 | 4/2015 | | |
| DE | 102014223258 A1 | 5/2015 | | |
| DE | 102014223269 A1 | 5/2015 | | |
| DE | 102014205830 A1 * | 10/2015 | | B60W 50/12 |
| DE | 102014011802 A1 | 2/2016 | | |
| DE | 102015208068 A1 | 11/2016 | | |
| DE | 102016109978 A1 | 12/2016 | | |
| DE | 102015010203 A1 | 2/2017 | | |
| DE | 102016116910 A1 | 3/2017 | | |
| WO | WO-2016/117790 A1 | 7/2016 | | |

OTHER PUBLICATIONS

International Search Report and Written Opinion of the International Searching Authority directed to related International Patent Application No. PCT/EP2018/054069, dated May 17, 2018, with attached English-language translation; 19 pages.

Chinese Application No. 201880006462.0, Office Action dated Jun. 29, 2022; 8 pages.

* cited by examiner

METHOD FOR OPERATING A MOTOR VEHICLE IN AN ACTIVATED, AT LEAST PARTIALLY AUTONOMOUS DRIVING MODE AND AUTHORIZATION DEVICE FOR A MOTOR VEHICLE AND A MOTOR VEHICLE

TECHNICAL FIELD

The present application relates to a method for operating a motor vehicle in an activated at least semi-autonomous driving mode. Moreover, the present application relates to an authorization device for a motor vehicle, which comprises a control unit and which is designed to be controlled in an activated at least semi-autonomous driving mode of the control unit as well as a motor vehicle with such a control unit.

BACKGROUND

At least semi-autonomously operable motor vehicles (i.e. semi-autonomously or fully autonomously operable motor vehicles) are already known from the prior art. In this case, a control unit of the motor vehicle takes over the guidance or the at least partial guidance thereof and controls the motor vehicle along a route to reach a predetermined destination. The control unit takes over the control of a transverse steering and/or longitudinal steering of the motor vehicle, such as the control over the speed, steering and/or braking of the motor vehicle. In this regard, the prior art deals with the problem of when a change from a semi-autonomous driving mode is to be permitted in a manual driving mode.

In this context, DE 10 2012 223 758 A1 describes a method for changing a driving control in an autonomous vehicle, in which the driving control can be switched between a driver and the autonomous vehicle. The method prevents a child or a person unable to drive from taking control.

WO 2016/117 790 A1 discloses a device for changing a driving mode of a vehicle. The device detects a state of a driver, in particular whether the driver is able to control the vehicle manually. Only when this is the case, a change of the drive mode to a manual drive mode is allowed.

US 2006/0 190 419 A1 describes a camera system, which recognizes facial features, a physical condition and a degree of intoxication in a person. A service or access is denied, if a person below the legal drinking age is detected. If this person is the occupant of a motor vehicle and it is determined that this person represents a danger, security or a police department will be contacted.

A disadvantage of the at least semi-autonomously operable motor vehicles described is that the driving ability of a motor vehicle occupant is checked only for a manual driving mode of the motor vehicle. It is possible, however, that the attention of a motor vehicle occupant is required even if the motor vehicle is operated in an at least semi-autonomous vehicle mode. This is the case in particular when a dangerous situation or a traffic situation arises for which the semi-autonomous vehicle mode is not or only partially designed. Furthermore, manual user input may be necessary to operate the at least semi-autonomous vehicle mode such as an input relating to a desired route or a desired destination. Again, dangerous situations may arise depending on the driving ability of the vehicle occupant.

DETAILED DESCRIPTION

The object of the present application is to provide a method for operating a motor vehicle in an activated at least semi-autonomous driving mode, in which the vehicle is operated as safely as possible and potentially dangerous situations for a motor vehicle occupant are reduced.

This object is achieved by the subject matter of the independent claims. Advantageous further developments of the invention are disclosed by the dependent claims, the description below, and the figures.

In accordance with some embodiments, when operating a motor vehicle is in an activated at least semi-autonomous driving mode, it should be checked whether at least one motor vehicle occupant of the motor vehicle is authorized to drive the motor vehicle in the at least semi-autonomous driving mode. On the one hand, it can prevent an unauthorized person such as a child from being alone in the motor vehicle while driving in the at least semi-autonomous driving mode. It can be assumed here that the unauthorized person is incapable or only partially capable of reacting properly in the event of a dangerous road traffic situation. In such a dangerous situation, for example, it may be necessary for a motor vehicle occupant to take over the control of the motor vehicle himself in order to avert or contain the danger, which, however, cannot be done by a child, for example.

In accordance with some embodiments, an authorized person can still give permission to the unauthorized person to drive alone in the motor vehicle in the at least semi-autonomous driving mode. In order to further ensure the safety of the motor vehicle occupant and a motor vehicle environment in general, the scope of the at least semi-autonomous driving mode can be restricted and/or the operation of the at least semi-autonomous driving mode can be tied to specific conditions.

In accordance with some embodiments, a method for operating the motor vehicle in an activated at least semi-autonomous driving mode is disclosed. The method provides that a detection device arranged in the motor vehicle detects at least one motor vehicle occupant in the motor vehicle. In this regard, the at least one motor vehicle occupant can be detected when entering the vehicle, and/or the motor vehicle interior can be checked for at least one potential motor vehicle occupant upon detection of the activation of the at least semi-autonomous driving mode. The method further provides that an authorization device coupled to the detection device checks after having detected the at least one motor vehicle occupant whether at least one of the at least one detected motor vehicle occupant satisfies at least one authorization criterion. The authorization device can check the at least one authorization criterion for each detected motor vehicle occupant for example until one of the at least one detected motor vehicle occupant fulfills the authorization criterion. The totality of the motor vehicle occupants may be detected as well, and only subsequently be checked by the authorization device to determine whether at least one of the motor vehicle occupants fulfills the at least one authorization criterion.

When the at least one authorization criterion is met, the authorization device generates an enable signal and sends it to a control unit of the motor vehicle. Upon receipt of the enable signal, the control unit activates the at least semi-autonomous drive mode. The control unit then controls the motor vehicle along a route to reach a predetermined destination.

In accordance with some embodiments, if the at least one authorization criterion is not met, the authorization device sends an inquiry signal to an authorization device which is external to the vehicle. The external authorization device is, for example, a mobile terminal which is controlled by an authorized person who meets the at least one authorization criterion. The authorized person is a legal guardian of the child, for example, who has been detected in the motor vehicle. The authorization device can display information to the at least one detected motor vehicle occupant and/or issue a request as to whether the at least semi-autonomous driving mode of the motor vehicle may be activated. Depending on receiving the enable signal received in response to the inquiry signal, the authorization device forwards the enable signal that was received to the control unit. In other words, if the at least one authorization criterion is not met, the at least semi-autonomous driving mode is activated only if, after the transmission of the inquiry signal, the authorization device receives an enable signal externally, namely from the vehicle-external authorization device. The vehicle-external authorization device can detect the enable signal via a user input. For example, the parent or legal guardian gives their consent via a predetermined keystroke or touching a predetermined display field on the authorization device that the at least one detected child in the motor vehicle may ride in the at least semi-autonomously driving motor vehicle without them.

The authorization device can establish a communication connection to at least one predetermined authorization device for the transmission of the inquiry signal and/or for receiving the enable signal. The at least one authorization device can be assigned to a specific motor vehicle occupant. When detecting a particular child in the motor vehicle, for example, a communication link is established with the authorization device of a particular guardian. The authorization device may alternatively or additionally be associated with a specific time such as a specific time of day and/or a particular day of the week. Upon detection of the particular child in the car, for example, the inquiry signal can be sent to the authorization device of a first parent or legal guardian in the morning and to the authorization device of a second legal guardian in the afternoon, for example, to take into consideration the availability of the respective parent or legal guardian.

The authorization device may be coupled with the control unit or integrated in the control unit for forwarding the enable signal. The control unit may detect a time upon having detected the activation of the semi-autonomous driving mode. If no enable signal is still received after a predetermined period of time, the control unit may send a notification which informs the at least one motor vehicle occupant that he is not authorized to ride in the vehicle. Furthermore, the control unit may then terminate the operation of the motor vehicle.

In accordance with some embodiments, an unauthorized ride in an at least semi-autonomously driving motor vehicle can be prevented. As a result, it is possible to prevent a person who is unable to drive from entering a potentially dangerous traffic situation. Furthermore, it is advantageous that when the person unable to drive rides in the at least semi-autonomously driving vehicle without a person who is able to drive, at least one authorized person such as the parent or legal guardian is notified. This way, said person may make decisions in possible dangerous situations on the basis of additional remote queries. If, for example, a traffic situation occurs that requires intervention by a person and/or an assessment by a human being, the control unit can send a corresponding request signal to the authorization device, which continues to send the request signal to the at least one authorization device outside of the vehicle. It can display information about the traffic situation and request a decision regarding the further control of the motor vehicle. Furthermore, the vehicle-external authorization device can detect user input, which may contain such a decision and/or a control command and can send it back to the authorization device and the control unit. The control unit then executes the decision and/or the control command. This way, the unauthorized vehicle occupant may continue to ride in the vehicle as safely as possible.

The present application also includes optional further developments of the method, which offer additional advantages.

In accordance with some embodiments, the vehicle-external authorization device generates the enable signal in response to a predetermined user input via a control panel of the vehicle-external authorization device upon receipt of the inquiry signal. The control panel may include an operating button and/or a touch-sensitive display panel. The predetermined user input may be that a predetermined operation key is pushed and/or a predetermined part of the display area is touched and/or a voice command is given.

In accordance with yet another embodiment, the vehicle-external authorization device generates the enable signal depending on a user setting stored in a memory of the authorization device. A command for automatically transmitting the enable signal upon receipt of an inquiry signal may be stored in the memory of the authorization device. The memory can also store the instruction that the command is executed only if certain conditions are met. The enable signal may be automatically sent upon receipt of the inquiry signal from the vehicle-external authorization device only when, for example, a predetermined unauthorized person is detected. This way, a parent or legal guardian may store in the memory of his or her authorization device that, upon detection of one particular child in the motor vehicle, the activation of the semi-autonomous driving mode should be automatically authorized and therefore, in this case, the enable signal should be sent automatically, but that no enable signal should be sent upon detection of the other child. This is advantageous, for example, if the respective unauthorized motor vehicle occupants detected in each case have different ages and/or varying driving abilities. One is more likely to trust a non-authorized teenage motor vehicle occupant to respond appropriately to a dangerous traffic situation than a child or toddler. The memory of the vehicle-external authorization device also has the advantage that an enable signal can be generated even if the person who operates the vehicle-external authorization device is currently unavailable.

In accordance with some embodiments, the enable signal comprises information about the destination. Upon having received the enable signal, the control unit selects the destination included in the enable signal and activates the at least semi-autonomous drive mode. The control unit then controls the motor vehicle along a route to reach the selected destination. The fact that the enable signal specifies the destination has the advantage that, if the destination is changed again, another enable signal with the changed destination is required. The unauthorized vehicle occupant will thus be prevented from changing the destination on his own after the vehicle has been approved for the semi-autonomous driving mode, but will require another enabling action. As a result, the authorized person, such as the legal guardian, keeps track of the drive of the unauthorized vehicle occupant in the semi-autonomous moving motor vehicle.

In accordance with yet another embodiment, the destination is specified by the fact that the vehicle-external authorization device recognizes a further predetermined user input via the control panel of the authorization device. The user of the vehicle-external authorization device can enter the destination upon receipt of the inquiry signal via the control panel and/or select it from a list of predetermined destinations. Alternatively or additionally, a user setting is stored in the memory of the authorization device, which specifies the destination depending on the inquiry signal and/or the detected motor vehicle occupant. Alternatively or additionally, the destination can be specified by the authorization device. For this purpose, the authorization device recognizes a user input via a control panel of the authorization device and/or a stored user setting is provided in a memory of the authorization device, which includes the destination. The authorization device can also be linked to a navigation device of the motor vehicle and receive information about the destination from the navigation device. The destination can therefore be determined from within the motor vehicle or externally. If the destination is selected by an operation of the authorization device, the inquiry signal sent to the vehicle-external authorization device may contain information about the selected destination. The control unit may activate the at least semi-autonomous driving mode for steering the motor vehicle to the destination only if the enable signal includes information about the destination. The user of the vehicle-external authorization device can thus determine where the unauthorized vehicle occupant may drive the motor vehicle. This way, the parent or legal guardian obtains a better overview of the drive of his child, for example.

In accordance with yet another embodiment, the destination is stored in the memory of the authorization device with at least one calendar time assigned to the destination. The calendar time may be a specific date, a specific time, a specific time of day, and/or a specific day of the week. The calendar time may also be a periodically recurring calendar time such as every Monday. If the authorization criterion is not met, the authorization device sends an inquiry signal to the authorization device outside the vehicle at a predetermined time interval prior to or at the at least one stored calendar time. The authorization device adopts the stored, assigned destination during the predetermined time interval prior to or at least at the stored calendar time and uses the same as a current destination. The enable signal forwarded to the control unit may then include the current destination. Information may be stored in the memory of the authorization device, for example, that indicates that the control unit is to control the motor vehicle to a particular school on at least one working day at a certain time, for example at 8:00 AM, after having detected the at least one specific child in the interior of the motor vehicle. The authorization device can then already send out the inquiry signal during a predetermined period of time prior to the specific time, for example at 7:55 AM. The at least one child may already sit in the vehicle. The specific time at which the motor vehicle is to leave may include a tolerance time, so that a delay of the at least one expected motor vehicle occupant is taken into account. The calendar time stored in the memory of the authorization device with the assigned destination may be coordinated with a further memory of a mobile terminal such as the memory of the vehicle-external authorization device. This way, the authorization device of the parent or guardian may, for example, comprise a calendar in which at least one specific calendar time is stored with a specific destination assigned. By means of the communication connection between the authorization device and the authorization device, an information signal may be sent to the memory of the authorization device about a change in the calendar and said device may then store this change. This way, the parent or guardian can enter the individual appointments of his child in the calendar. Furthermore, the enable signal for at least one specific calendar time with the respectively associated destination may already be stored in the calendar and be automatically sent upon receipt of the request signal. The user of the authorization device thus does not have to re-enable routes that were previously known and authorized each and every time. This makes the process particularly user-friendly.

In accordance with some embodiments, at least one operating parameter selectable in the at least semi-autonomous driving mode and/or a functional scope of the at least semi-autonomous driving mode is restricted, if the at least one authorization criterion is not met. Thus, if the authorization device determines that none of the at least one detected motor vehicle occupant meet the at least one authorization criterion, the authorization device can send a restriction signal to the control unit of the motor vehicle. Upon receipt of the restriction signal, the control unit restricts at least one selectable operating parameter, such as a speed of the motor vehicle, and/or a range of functions such as the operation of the at least semi-autonomous drive mode. The restriction signal may, for example, prevent the motor vehicle from starting up. However, the restriction signal may also be integrated in the enable signal. In this case, for example, the restriction signal may include that the control unit controls the motor vehicle to a certain destination, but that only those routes may be selected to reach the destination that do not include a route via a highway. The restriction signal may be configured by a user input or a stored user setting. This offers the advantage that the safety of an at least semi-autonomous drive of a motor vehicle with only a vehicle occupant who is not authorized to drive the vehicle is increased, since a person authorized to drive the vehicle is able to externally control and monitor the scope of this semi-autonomous drive. For example, limiting the speed of the motor vehicle during the at least semi-autonomously controlled ride reduces the risk of a catastrophic accident.

In accordance with some embodiments, the at least one operating parameter and/or the functional scope relates to a speed and/or a maximum speed of the motor vehicle and/or the destination and/or the route and/or a type of road along the route. A type of road may be, for example, a city street, a country road, a state highway, a highway or an interstate. This can prevent a child for example from subsequently changing the approved destination itself.

In accordance with yet another embodiment, a restriction of the at least one operating parameter and/or of the functional scope is determined as a function of at least one predetermined time and/or as a function of at least one predetermined time interval. The at least one predetermined time may, for example, be the calendar time with the assigned destination. The at least one predetermined time interval may include the calendar time. However, the predetermined time interval may also be a relative time indication such as mornings, afternoons, evenings or nights. The restriction in terms of time offers the advantage that the operating parameter and/or the functional scope of the control unit is automatically restricted when it is to be expected that no person authorized to drive the vehicle will be present. As a result, the user of the vehicle-external authorization device does not have to be constantly available.

In accordance with some embodiments, the at least one authorization criterion includes that the at least one motor vehicle occupant is recognized by the authorization device as able to drive. The at least one authorization criterion can furthermore include that the at least one motor vehicle occupant was recognized as being of legal age and/or recognized as being authorized to drive. The at least one authorization criterion checks whether at least one of the at least one motor vehicle occupants is able, both physically and mentally, to act quickly and correctly in a dangerous situation in traffic. This check increases the safety of the at least one motor vehicle occupant as well as the safety of the persons who are in the surroundings of the motor vehicle.

In accordance with some embodiments, the detection device detects the at least one motor vehicle occupant by detecting a voice and/or an image and/or a biometric feature and/or a change in weight on a driver's seat of the motor vehicle and/or by detecting a vehicle-external control device in the motor vehicle. The detection device may comprise a camera and/or a microphone and/or a sensor for detecting a biometric feature. The detection device may further include other sensors in and/or on the motor vehicle, which detect, for example, that a weight is placed on the driver's seat or that a mobile terminal is located in the interior of the motor vehicle. The detection device may detect, for example, a voice in the motor vehicle when the motor vehicle is started. Before the voice recognition begins, a sequence of sounds may be issued in the vehicle, such as the question "Where do you want to go?". Based on the voice detected by the detection device, the authorization device can check whether this voice can be assigned to a stored voice and/or a stored personal profile. The detection device can also detect, for example, a mobile telephone and/or the authorization device in the motor vehicle interior, and the authorization device may check whether the mobile telephone and/or the authorization device can be assigned to a personal profile. Alternatively, the detection device may comprise a scanner which scans an identification card such as a student ID card or a driver's license and/or an ID card. The authorization device may also be able to check and assign said ID card. The detection device may also detect the at least one motor vehicle occupant by means of a fingerprint sensor, which is provided, for example, on a door handle of the motor vehicle, and/or by means of an eye detection sensor. This results in a large number of options for the detection of the at least one motor vehicle occupant and for the determination whether this person is authorized to drive the vehicle. Through a combination of the different detection options, the accuracy of the assignment to a personal profile and/or the determination of whether the at least one motor vehicle occupant meets the at least one authorization criterion can be increased.

In accordance with some embodiments, the authorization device for a motor vehicle according to the invention is configured to receive information about at least one motor vehicle occupant detected in the motor vehicle. For this purpose, the authorization device may comprise a detection device or be designed to be linked to a detection device. After having detected the at least one motor vehicle occupant, the authorization device is configured to check whether at least one of the at least one detected motor vehicle occupants meets at least one authorization criterion. If the at least one authorization criterion is met, the authorization device is configured to generate an enable signal and send it to a control unit of the motor vehicle. The enable signal includes the activating of an at least semi-autonomous drive mode. In this case, when the motor vehicle is controlled in an activated at least semi-autonomous driving mode, the control may guide the motor vehicle to reach a destination. If the authorization criterion is not met, the authorization device is configured to send out an inquiry signal to a predetermined external authorization device. Depending on the enable signal received in response to the inquiry signal, the authorization device is configured to forward the received enable signal to the control unit.

The advantages and further developments described above in connection with the method for operating a motor vehicle in an activated at least semi-autonomous driving mode apply mutatis mutandis to the authorization device for a motor vehicle as described herein.

In accordance with some embodiments, a motor vehicle comprising a control unit which is designed to control the motor vehicle along a route to reach a destination in an activated at least semi-autonomous driving mode is disclosed. The motor vehicle comprises the authorization device as described herein in accordance with some embodiments.

The advantages and further developments described above in connection with the method in accordance with some embodiments for operating a motor vehicle in an activated at least semi-autonomous driving mode as well as with the authorization device for a motor vehicle as described herein in accordance with embodiments apply correspondingly to the motor vehicle according to the invention.

The present application also includes further developments of the method, which have features such as those previously described in connection with the further developments of the motor vehicle as described herein. For this reason, the corresponding further developments of the method are not described herein.

Embodiments of the present application are described below with reference to the drawings.

The embodiments explained below are preferred embodiments of the present application. In the embodiments, the described components of the embodiments constitute individual features of the present application that are to be considered individually or in a combination other than the one disclosed. In addition, features other than those already described can be added to the embodiments described.

In the drawings, elements with the same function have been provided with the same reference signs.

Figure 1:
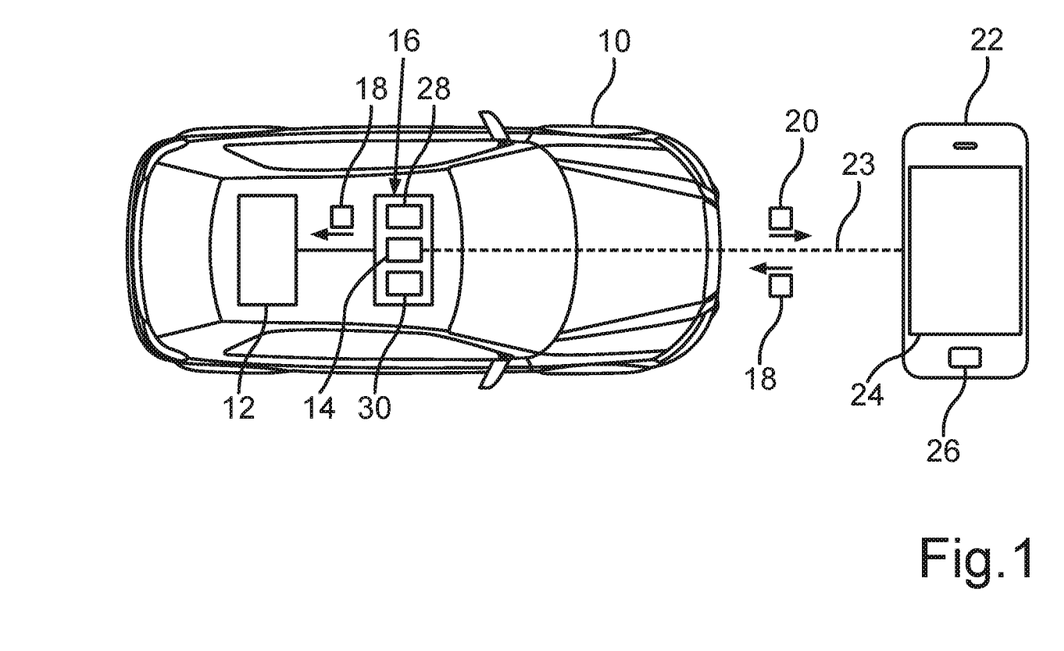
FIG. 1 is a schematic representation of a motor vehicle with a control unit for operation in an at least semi-autonomous driving mode, in accordance with some embodiments.
Figure 2:
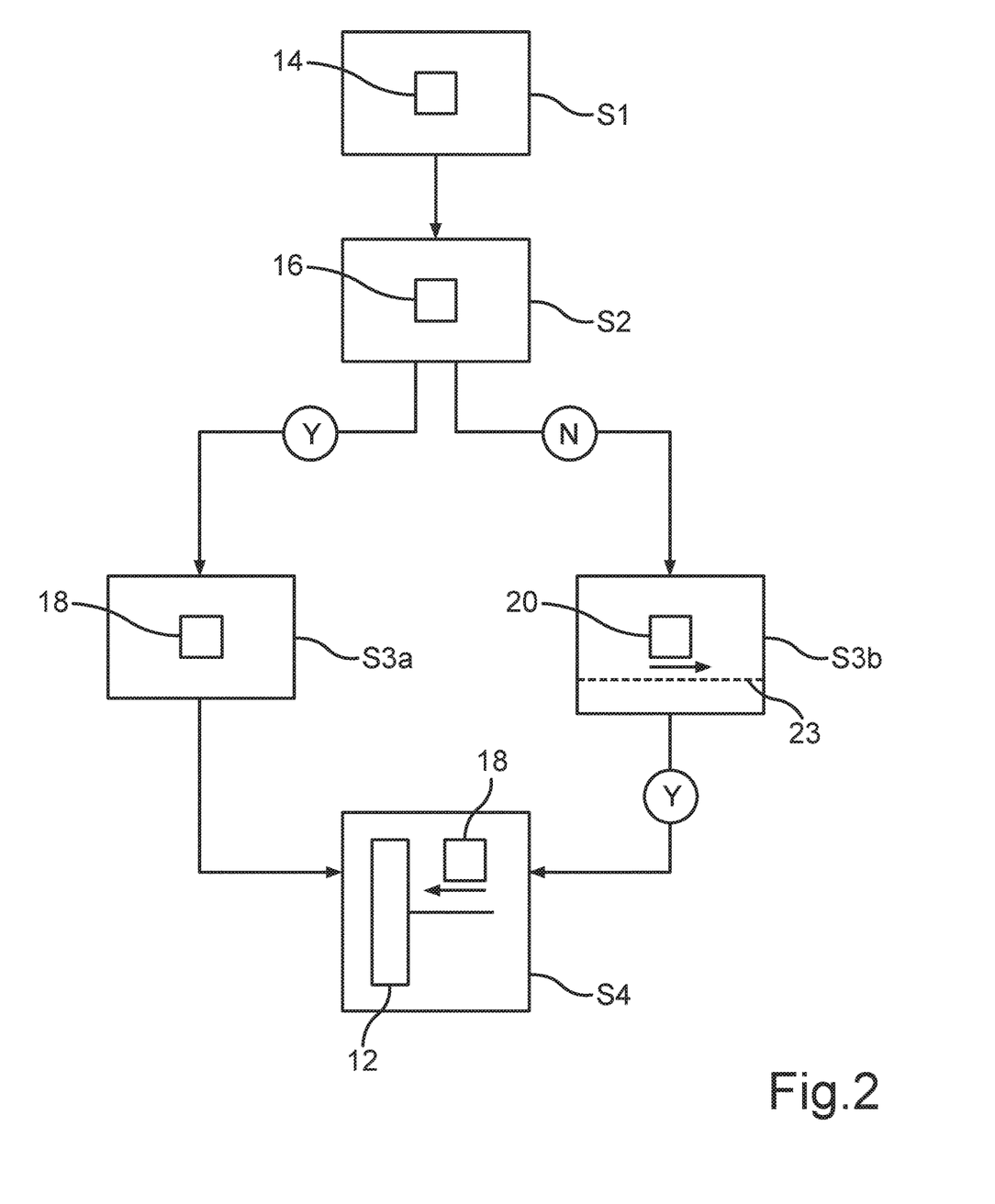
FIG. 2 is a flow-chart of the method steps of a method for operating the motor vehicle in the at least semi-autonomous driving mode, in accordance with some embodiments.

FIG. 1 shows a schematic representation of a motor vehicle with a control unit for operation in an at least semi-autonomous driving mode. FIG. 1 shows a schematic representation of a motor vehicle 10 with a control unit 12 for operating the motor vehicle 10 in an at least semi-autonomous driving mode. FIG. 2 shows a flow-chart which describes the related method steps for a method for operating the motor vehicle 10 in the at least semi-autonomous driving mode. Below, the two figures are explained together.

In accordance with some embodiments, an at least semi-autonomous driving mode comprises that the control unit 12 controls the motor vehicle 10 for reaching a predetermined destination along a route. The control unit 12, for example, controls the steering, braking and acceleration of the motor vehicle 10 for this purpose. The motor vehicle 10 comprises a detection device 14, which detects at least one motor vehicle occupant in a first method step S1. The detection device 14 detects, for example, a voice and/or a mobile telephone and/or an ID card and/or a weight and/or a fingerprint and/or an eye of the at least one motor vehicle occupant. The detection device 14 can also detect only those motor vehicle occupants, which are on the designated driver's seat, for example behind a steering wheel of the motor vehicle 10. The detection device 14 may be configured as a camera, a microphone, a sensor or a combination thereof. The detection device 14 can then detect the at least one motor vehicle occupant when the control unit 12 detects the activation of the at least semi-autonomous driving mode. Alternatively, the detection is carried out when it is determined that the at least one motor vehicle occupant has entered the motor vehicle 10.

In FIG. 1, the detection device 14 is integrated in an authorization device 16. Alternatively, the detection device 14 may be linked with the authorization device 16, such as via a radio link or an electrical line. The authorization device 16 receives information from the detection device 14 about the at least one detected motor vehicle occupant and, in a second method step S2, checks whether at least one of the detected motor vehicle occupants meets at least one authorization criterion. If the authorization device 16 determines that the at least one motor vehicle occupant meets the at least one authorization criterion (Y), then it sends an enable signal 18 to the control unit 12 in a third method step S3a. If, for example, at least one of the detected motor vehicle occupants has a driver's license, the authorization device 16 generates the enable signal 18 and the at least semi-autonomous driving mode is activated and/or continued upon receipt of the enable signal 18 by the control unit 12 in a fourth method step S4. For this purpose, the authorization device 16 may be linked to the control unit 12 or integrated in the control unit 12.

In accordance with some embodiments, if the authorization device 16 determines that none of the detected motor vehicle occupants meets the at least one authorization criterion (N), the authorization device 16 first sends an inquiry signal 20 to an authorization device 22 external of the vehicle in an alternative third method step S3b. For this purpose, the authorization device 16 establishes a communication connection 23 with the vehicle-external authorization device 22. The communication connection 23 can be configured as a mobile radio, Bluetooth or WLAN connection. If the entitlement device 16 receives a enable signal 18 via the communication link 23 in response to the transmitted inquiry signal 20 (Y), the authorization device 16 forwards the enable signal 18 to the control unit 12 and the method step S4 is then executed. However, if an enable signal 18 is not received, the at least semi-autonomous drive mode is disabled and/or deactivated.

The vehicle-external authorization device 22 is, for example, a mobile telephone of a legal guardian and/or a vehicle owner of the motor vehicle 10. The authorization device 22 comprises a control panel 24 which can receive the inquiry signal 20 via an audio-visual input and which the guardian can use to enter whether he allows the activation of the at least semi-autonomous driving mode and/or for which destination the at least semi-autonomous driving mode is permitted. The authorization device 22 furthermore comprises a memory 26, in which at least one user setting can be stored, with the user setting containing information about whether the enable signal 18 is to be generated upon receipt of a specific inquiry signal 20. For this purpose, it can be checked whether the contents of the inquiry signal 20 meet predetermined conditions, such as, for example, the age of the child detected in the motor vehicle 10 and/or a specific destination and/or a certain distance and/or a specific calendar time. In this case, the inquiry signal 20 may include information on this or the subsequently generated enable signal 18 may provide this information. The vehicle-internal authorization device 16 also includes a control panel 28 and a memory 30. An indication of the destination and/or a certain distance and/or a specific calendar time can also be determined by a motor vehicle occupant via the operating panel 28 or the memory 30.

In accordance with some embodiments, if it is determined by the authorization device 16 that none of the at least one motor vehicle occupants in the motor vehicle 10 meets the at least one authorization criterion, the authorization device 16 can restrict the at least semi-autonomous driving mode. The restriction includes that even in the presence of the enable signal 18 only certain routes may be permitted, such as a ride to kindergarten or school only. Furthermore, the restriction includes that a vehicle speed of the motor vehicle 10 is regulated such that the motor vehicle 10 does not exceed a predetermined maximum speed. A display device on the motor vehicle may also indicate that no persons authorized to drive the vehicle are in the motor vehicle. It may indicate, for example, that it is a so-called school trip. Furthermore, the restriction may include a time constraint, such that the child in the motor vehicle may only select weekdays from a restricted list of selectable destinations, but has multiple destinations available on the weekend. On the weekend, for example, the child may choose to drive to a soccer club and/or to the movie theater. The memory 30 of the authorization device 16 or the memory 26 of the vehicle-external authorization device 22 may also comprise an appointment schedule for a child. The authorization device 16 can thereby ask the parent or guardian in advance for an approval of a specific stored trip to a stored destination. The guardian can decide in advance which destination will be approved.

Overall, the examples show how the present application restricts and/or prevents the use of an at least semi-autonomously controlled motor vehicle by persons not authorized to drive the car such as a child.

The invention claimed is:

1. A method for operating a motor vehicle, comprising:
   detecting, at a detection device, at least one motor vehicle occupant in the motor vehicle, wherein the detection device is arranged in the motor vehicle;
   in response to detection of the at least one motor vehicle occupant, checking, at an authorization device linked to the detection device, the at least one motor vehicle occupant meets at least one authorization criterion;
   generating, at the authorization device, an enable signal based on the at least one authorization criterion being met;
   sending, from the authorization device to a control unit, the enable signal;
   activating, at the control unit, an at least semi-autonomous driving mode of the motor vehicle; and
   controlling, at the control unit, the motor vehicle in the at least semi-autonomous driving mode to reach a destination along a route;

in response to the at least one authorization criterion not being met, automatically sending, from the authorization device to another authorization device external to the motor vehicle, an inquiry signal;

receiving, at the authorization device, an external enable signal from the another authorization device based on the inquiry signal; and forwarding, from the authorization device to the control unit, the external enable signal.

2. The method of claim 1, further comprising:

in response to the received inquiry signal, generating, at the another authorization device, the external enable signal based on a predetermined input provided via a control panel of the another authorization device or a configuration setting stored in a memory of the another authorization device.

3. The method of claim 1, further comprising selecting, at the control unit, the destination, wherein the enable signal comprises information about the destination.

4. The method of claim 1, further comprising selecting, at another authorization device, information about the destination based on an input provided via a control panel of the another authorization device, or a configuration setting stored in a memory of the another authorization device, or an input provided via a control panel of the authorization device, or a configuration setting stored in a memory of the authorization device.

5. The method of claim 1, further comprising:

in response to the at least one authorization criterion not being met, determining, at the another authorization device, the destination based on a stored destination in a memory of the authorization device during a predetermined time interval, wherein the predetermined time interval is at or prior to at least one calendar time associated with the stored destination in the memory of the authorization device.

6. The method of claim 1, further comprising:

in response to the at least one authorization criterion not being met, restricting at least one operating parameter or at least one of a functional scope of the at least semi-autonomous driving mode.

7. The method of claim 6, wherein the at least one operating parameter or the at least one of the functional scope is related to a speed of the motor vehicle, the destination, the route, or a type of road of the route.

8. The method according to claim 6, wherein the at least one operating parameter or the at least one of the functional scope is determined as a function of at least one predetermined time or at least one predetermined time interval.

9. The method of claim 1, wherein the at least one authorization criterion comprises the at least one motor vehicle occupant is recognized by the authorization device as able to drive, and wherein the at least one motor vehicle occupant is an adult or authorized to drive the motor vehicle.

10. The method of claim 1, further comprising:

detecting, at the detection device, the at least one motor vehicle occupant by a voice, an image, a biometric feature, a weight on a driver seat of the motor vehicle, or via a control device external to the motor vehicle.

11. An authorization device, comprising:

a control unit configured to be controlled in an activated at least semi-autonomous driving mode of a motor vehicle along a route to reach a destination;

wherein the authorization device is configured to:

receive information about at least one motor vehicle occupant detected in the motor vehicle;

in response to the at least one motor vehicle occupant detected in the motor vehicle, verify the at least one motor vehicle occupant meets at least one authorization criterion;

generate an enable signal based on the at least one authorization criterion being met;

send the enable signal to the control unit to instruct the control unit to change to the at least semi-autonomous driving mode;

in response to the at least one authorization criterion not being met, automatically send an inquiry signal to another authorization device, wherein the another authorization device is external to the motor vehicle;

receive an external enable signal from the another authorization device based on the inquiry signal; and forward the external enable signal to the control unit.

12. The authorization device of claim 11, further comprising:

a memory, wherein the authorization device is further configured to:

determine the destination based on a stored destination in the memory during a predetermined time interval in response to the at least one authorization criterion not being met, wherein the predetermined time interval is at or prior to at least one calendar time associated with the stored destination in the memory.

13. The authorization device of claim 11, wherein the at least one authorization criterion comprises the at least one motor vehicle occupant is recognized by the authorization device as able to drive, and wherein the at least one motor vehicle occupant is an adult or the at least one motor vehicle occupant is authorized to drive the motor vehicle.

14. The authorization device of claim 11, further configured to:

in response to the at least one authorization criterion not being met, restrict at least one operating parameter or at least one of a functional scope of the at least semi-autonomous driving mode.

15. A motor vehicle, comprising:

a control unit configured to be controlled in an activated at least semi-autonomous driving mode of the motor vehicle along a route to reach a destination; and an authorization device, wherein the authorization device is configured to:

receive information about at least one motor vehicle occupant detected in the motor vehicle;

in response to the at least one motor vehicle occupant detected in the motor vehicle, verify the at least one motor vehicle occupant meets at least one authorization criterion;

generate an enable signal based on the at least one authorization criterion being met;

send the enable signal to the control unit to instruct the control unit to change to an at least semi-autonomous driving mode of the motor vehicle;

in response to the at least one authorization criterion not being met, automatically send an inquiry signal to another authorization device, wherein the another authorization device is external to the motor vehicle;

receive an external enable signal from the another authorization device based on the inquiry signal; and forward the external enable signal to the control unit.

16. The motor vehicle of claim 15, wherein the at least one authorization criterion comprises the at least one motor vehicle occupant is recognized by the authorization device as able to drive, and wherein the at least one motor vehicle occupant is an adult or the at least one motor vehicle occupant is authorized to drive the motor vehicle.

17. The motor vehicle of claim 15, further comprising:
a detection device, wherein the detection device is configured to:
detect the at least one motor vehicle occupant by a voice, an image, a biometric feature, a weight on a driver seat of the motor vehicle, or via a control device external to the motor vehicle.

* * * * *